No. 793,927. PATENTED JULY 4, 1905.
W. H. FULCHER.
FRICTION CLUTCH.
APPLICATION FILED MAY 16, 1904.

WITNESSES,
Chas. E. Chapin.

INVENTOR,
William H. Fulcher
By Geo. H. Strong. atty

No. 793,927.

Patented July 4, 1905.

UNITED STATES PATENT OFFICE.

WILLIAM H. FULCHER, OF OAKLAND, CALIFORNIA, ASSIGNOR OF ONE-HALF TO HERMAN MURPHY, OF SAN FRANCISCO, CALIFORNIA.

FRICTION-CLUTCH.

SPECIFICATION forming part of Letters Patent No. 793,927, dated July 4, 1905.

Application filed May 16, 1904. Serial No. 208,154.

*To all whom it may concern:*

Be it known that I, WILLIAM H. FULCHER, a citizen of the United States, residing at Oakland, in the county of Alameda and State of California, have invented new and useful Improvements in Friction-Clutches, of which the following is a specification.

My invention relates to a clutch mechanism designed to readily unite or disengage revoluble parts.

It consists of a plurality of circular segments forming one member of the clutch, an exterior shell forming the other member, and mechanism by which the said segments are simultaneously expanded within the shell to produce the grip and unite the two members or correspondingly contracted to release the grip and allow either member to be moved separately.

My invention comprises details of construction which will be more fully explained by reference to the accompanying drawings, in which—

Figure 1:
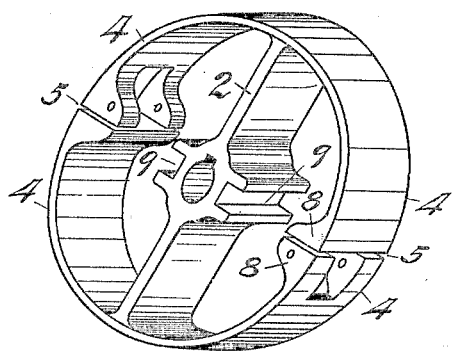
Figure 2:
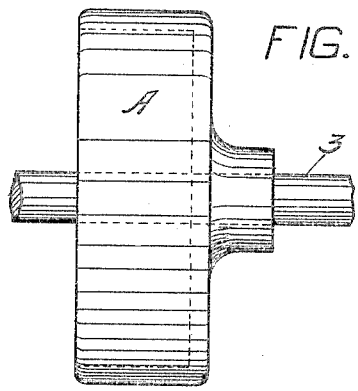
Figure 3:
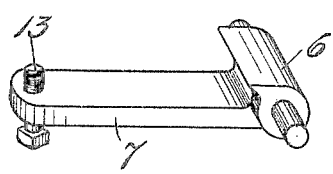
Figure 4:
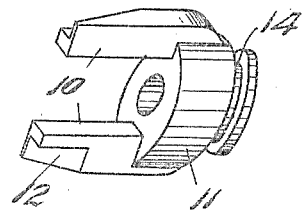
Figure 5:
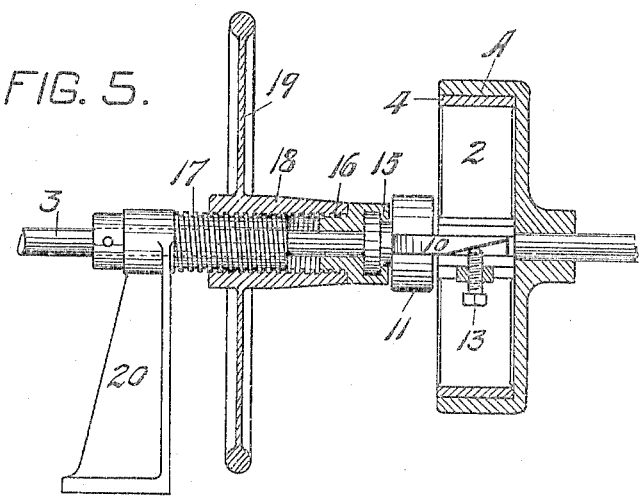
Figure 6:
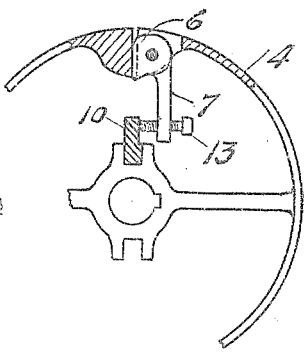

Figure 1 is a perspective view of spider. Fig. 2 is an exterior view of shell. Fig. 3 is a perspective view of cam. Fig. 4 is a perspective view of spreader. Fig. 5 is a section of clutch and operating mechanism. Fig. 6 is a partial view of rim, showing cam action upon both parts.

It is the object of my invention to provide a clutch which is especially designed for the driving of machinery of any description and particularly such machinery as is operated under heavy stresses.

As shown in the accompanying drawings, A is one member of my clutch, which in the present case is represented in the form of a cylindrical shell mounted upon a shaft 3 and having the interior surface made smooth and adapted to receive the frictional contact of the other member of the clutch. This second member consists of a web or spider having arms 2 projecting in opposite directions from a central hub, which in the present case is shown keyed upon the shaft 3, while the shell A is loosely turnable upon said shaft. Formed upon the ends of the arms 2 are the semicircular segments 4, these segments extending an equal distance to each side of the arms and meeting at the points 5 ninety degrees from the junction of the segments with the arms 2. These segments are separated, as shown, at the point 5 and are capable of expansion simultaneously and in opposite directions by any pressure brought to bear against their contiguous ends, each segment being thus movable from two diametrically opposed points, so that the entire circumference of the inner member is capable of being expanded in quadrants by moving of the free ends of said quadrants, the opposite ends of which are, as before stated, the junction with the radial arms 2. The expansion of these quadrants is practically equivalent to expanding the whole circumference of the inner member; but the power is applied in such a manner that the contiguous ends of each quadrant are separated from each other, and as their periphery coincides with the inner periphery of the shell A it will be seen that the frictional contact will be almost or quite the entire circumference of the parts with the pressure practically applied at four different points. In order to apply this pressure and to expand the segments, I have shown cams 6 fulcrumed to two opposite segments 4 one hundred and eighty degrees apart, and these cams have arms 7 projecting inwardly toward the hub or center, from which the arms 2 radiate. In order to properly secure these cams, I have shown the segments 4 made much thicker at their contiguous ends, as shown at 8, and one of these segments at each point is chambered to receive the cams 6, as plainly shown in transverse section, Fig. 6.

The hubs from which the arms 2 radiate have channels made in opposite sides, as shown at 9, and these channels are adapted to receive slides 10, which may be moved parallel with the axis of the shaft, as will be hereinafter more fully described. There are two of these channels 9 and two of the arms 10, which are fixed to or formed with a hub 11, which is slidable upon the shaft 3. These arms 10 have inclined or diagonal shoulders or offsets 12 formed upon the outer portion of the parts, which slide in the channel 9. Thus the part which slides in the channel 9 moves in straight line and serves as a guide, and the inclined or beveled surface 12 when moved in one direction acts against the end of a screw 13, which passes through the arm 7 of the cam 6, there being one of these upon each side of the shaft, as previously described. The screw 13 may be turned in the arm 7 so as to regulate the position of the arm and its cam, with the latter just pressing against the opposing face 8 of the contiguous segment.
It will now be seen that if the slide 10 be moved inwardly the action of the incline 12 will be to separate the arm 7, and thus, turning the cam 6, the pressure upon the face 8 will separate the two segments 4 and force them into frictional contact with the interior of the shell A. Upon the opposite side the same result is simultaneously attained, and thus the four segments are expanded into such frictional contact with the interior of the shell that either of the members of the clutch may serve as a driver for the other. It will be understood that the movement of the slides 10 and the inclines 12 in the opposite direction will immediately release the clutches, which by their own elasticity, or, if desired, by the employment of a spring, will be sufficiently withdrawn from contact with the outer shell to allow the parts to be rotated separately.

In order to make the proper connection with the hub 11, by which the slides 10 are moved, I have shown this hub having a groove or channel made around it, as at 14, and this groove or channel receives the segmental flanges 15, which, as shown, are of hook shape to engage with the groove, and the ends beyond the hub 11 inclose the shaft 3, around which they fit. The outside of the smaller portion is screw-threaded, as shown at 16. 17 is a second sleeve, also screw-threaded and having the same exterior diameter as the screw-threaded portion 16. Exterior to these is an interior screw-threaded sleeve 18, which is screwed upon the two, and this exterior sleeve has projecting arms 19, by which it is turnable. The screw-threaded portion 17 projects from a fixed support 20, and it will be seen that by turning the arms 19 the sleeve 18 and the clutch-hooks 15 are caused to travel upon the screw-threaded portion 17.
The hub 11 and the slides 10 will be either drawn back or moved forward. In the present case the inclines 12 are so constructed that when the slides are drawn away from the clutch members the latter will be released and allowed to turn freely, and when forced forward or toward the clutch members the inclines will act as before described to expand the clutch-segments and lock the two members together.

Having thus described my invention, what I claim, and desire to secure by Letters Patent, is—

1. An improved clutch having in combination an open-ended shell, a shaft upon which said shell is turnable, a hub fixed to the shaft and having arms projecting radially from opposite sides, said hub having longitudinally-extending grooves in its opposite sides, segments having their central portions rigid with the arms and separated at their meeting ends, a cam pivotally mounted in one of the meeting ends of one segment and adapted to bear against the meeting end of a companion segment whereby the meeting ends of the segments are simultaneously moved in opposite directions and substantially the entire circumference of the segments is expanded in unison, and a hub slidable on the shaft and having parallel spaced arms adapted to straddle the fixed hub said arms having beveled outer faces and said cams having arms projecting inwardly into the range of action of the slidable hub.

2. An improved friction-clutch having in combination a shell, a shaft upon which the same is turnable, a hub fixed to the shaft and having arms projecting radially from opposite sides, segments having central portions rigid with the arms, each of said segments having thickened ends and having one of such ends chambered with the chambered end of one segment located opposite the thickened unchambered end of the companion segment, oppositely-operating cams, one carried by each of the chambered ends of the segments and adapted to bear against the unchambered meeting end of a companion segment, and means for operating the cams in unison to cause the meeting ends of the segments to be moved together in substantially opposite direction.

3. The combination in a clutch of an exterior open-ended shell, a shaft upon which it is turnable, semicircular segments having arms in the center of each, connecting them with a central hub which is keyed to the shaft, cams by which the meeting ends of the segments are separated and expanded within the shell, guide-channels upon opposite sides of the hub, slides having inclined faces engaging the cam-levers, a grooved hub carrying said slides and slidable upon the shaft, segmental clutch-rings engaging the groove of the hub inclosing the shaft beyond the hub and having screw-threads upon the exterior, a correspondingly-fixed screw-threaded sleeve forming a continuation of said screw-threaded segments and an exterior screw-threaded sleeve connected with the clutch-segments and means by which said sleeve is turnable whereby the clutch-segments and slide-carrying hub are advanced or retracted.

In testimony whereof I have hereunto set my hand in presence of two subscribing witnesses.

WILLIAM H. FULCHER.

Witnesses:
S. H. NOURSE,
JESSIE C. BRODIE.